United States Patent
Ryu et al.

(10) Patent No.: US 8,251,883 B2
(45) Date of Patent: Aug. 28, 2012

(54) AUTOMATIC BALANCE ADJUSTING CENTRIFUGE AND THE CONTROL METHOD THEREOF

(75) Inventors: Heuigeun Ryu, Seoul (KR); Ohhun Kwon, Seoul (KR); Sunghyuk Lee, Seoul (KR); Jaehong Oh, Seoul (KR)

(73) Assignee: Hanlab Corporation, Paju-Si (KR)

( * ) Notice: Subject to any disclaimer, the term of this patent is extended or adjusted under 35 U.S.C. 154(b) by 1030 days.

(21) Appl. No.: 12/202,602

(22) Filed: Sep. 2, 2008

(65) Prior Publication Data

US 2010/0009833 A1  Jan. 14, 2010

(30) Foreign Application Priority Data

Jul. 10, 2008  (KR) .................. 10-2008-0067110

(51) Int. Cl.
*B04B 9/14* (2006.01)
(52) U.S. Cl. .................. 494/37; 494/20; 494/82
(58) Field of Classification Search ............. 494/1, 10, 494/12, 16–21, 33, 82, 84, 37; 73/457–458; 210/85, 144; 68/23.1, 23.2; 74/570.2, 571.1, 74/572.4

See application file for complete search history.

(56) References Cited

U.S. PATENT DOCUMENTS

| | | | | |
|---|---|---|---|---|
| 3,692,236 A | * | 9/1972 | Livshitz et al. | 494/20 |
| 3,762,635 A | * | 10/1973 | Hankey | 494/20 |
| 3,921,898 A | * | 11/1975 | Finkel | 494/26 |
| 4,079,882 A | * | 3/1978 | Mizuyoshi et al. | 494/60 |
| 4,099,667 A | * | 7/1978 | Uchida | 494/7 |
| 4,157,781 A | * | 6/1979 | Maruyama | 494/7 |
| 4,919,646 A | * | 4/1990 | Perdriat | 494/1 |
| 6,132,354 A | * | 10/2000 | Ohtsu et al. | 494/16 |
| 6,949,063 B2 | * | 9/2005 | Baik et al. | 494/1 |
| 7,025,714 B2 | * | 4/2006 | Escal | 494/1 |
| 7,115,090 B2 | * | 10/2006 | Lagarde | 494/10 |
| 7,285,085 B2 | * | 10/2007 | Kim et al. | 494/20 |
| 7,297,097 B2 | * | 11/2007 | Ryu et al. | 494/10 |
| 7,699,766 B2 | * | 4/2010 | Ellsworth et al. | 494/20 |
| 7,806,820 B2 | * | 10/2010 | Howell | 494/82 |
| 7,819,792 B2 | * | 10/2010 | Ryu et al. | 494/10 |
| 2004/0018927 A1 | * | 1/2004 | Baik et al. | 494/10 |
| 2004/0071569 A1 | * | 4/2004 | Ellsworth et al. | 417/363 |
| 2005/0026765 A1 | * | 2/2005 | Escal | 494/20 |
| 2006/0116269 A1 | * | 6/2006 | Lagarde | 494/1 |

(Continued)

FOREIGN PATENT DOCUMENTS

JP  2003236409 A * 8/2003

(Continued)

*Primary Examiner* — Charles E Cooley
(74) *Attorney, Agent, or Firm* — Rothwell, Figg, Ernst & Manbeck, P.C.

(57) ABSTRACT

The present invention relates to an automatic balance adjusting centrifuge which calculates the magnitude and the location of imbalance of itself based on the vibration generated in the dynamic state and automatically compensate for the imbalance based on the calculation, and the control method thereof. The method includes: (a) measuring the amount of vibration of a rotor of a centrifuge, supporting buckets that load samples, at a predetermined rotational velocity; (b) determining whether the amount of vibration measured in step (a) is greater than an allowed value; and (c) when the amplitude of the vibration is greater than the allowed value, compensating for a weight imbalance of the rotor by an amount calculated based on the vibration amount measured in step (a) and returning to step (a), otherwise, performing a centrifugal separation by accelerating the rotor to a working velocity.

5 Claims, 5 Drawing Sheets

U.S. PATENT DOCUMENTS

| | | | |
|---|---|---|---|
| 2006/0252627 A1* | 11/2006 | Kim et al. | 494/20 |
| 2007/0027014 A1* | 2/2007 | Ryu et al. | 494/10 |
| 2007/0142196 A1* | 6/2007 | Ellsworth et al. | 494/7 |
| 2007/0203010 A1* | 8/2007 | Kim et al. | 494/82 |
| 2008/0271786 A1* | 11/2008 | Howell | 137/13 |
| 2010/0009831 A1* | 1/2010 | Ryu et al. | 494/8 |
| 2010/0009833 A1* | 1/2010 | Ryu et al. | 494/9 |

FOREIGN PATENT DOCUMENTS

| | | | |
|---|---|---|---|
| JP | 2010-64012 | * | 3/2010 |
| JP | 2010-131480 | * | 6/2010 |
| WO | WO 0014493 A2 | * | 3/2000 |
| WO | WO 00/29122 | * | 5/2000 |
| WO | WO 2006054828 A1 | * | 5/2006 |

* cited by examiner

Drawing

AUTOMATIC BALANCE ADJUSTING CENTRIFUGE AND THE CONTROL METHOD THEREOF

CROSS REFERENCE TO RELATED APPLICATIONS

This application claims priority from Korean patent application No. 10-2008-0067110 filed on Jul. 10, 2008, all of which is incorporated herein by reference in its entirety for all purposes.

BACKGROUND OF THE INVENTION

1. Field of the Invention

The present invention relates to an automatic balance adjusting centrifuge and the control method thereof, and particularly to an automatic balance adjusting centrifuge calculating the magnitude and the location of the imbalance of the centrifuge by the vibration generated in the dynamic state and automatically compensating for the imbalance based on the calculation result.

2. Description of the Related Art

As is well known, a centrifuge is an essential equipment which is widely used over medical and physiochemical fields, and is an instrument which separates sample elements by rotating a rotor equipped with buckets containing samples at a high speed to provide the samples with high centrifugal acceleration. Thus, high density elements in the samples are placed at the outer layer along the radial direction of the rotor and low density elements in the samples are placed at the inner layer along the radial direction.

In the operation of the centrifuge, imbalance of the centrifugal force is inevitably created by the weight differences among buckets due to the discrepancy in the number of samples within each bucket or in the total weight. However, the conventional centrifuge without the automatic balancing function brought about a problem of imposing the laborious works on users, such as measuring the weight of each sample manually to load the samples with an identical weight on a rotor symmetrically.

To address this problem, the applicant has already suggested several automatic balance type centrifuges and reserved the rights in Korea as patents. To be concrete, Korean patent registration number KR 10-0343336 B1 (registered date: 4 Jun. 2002) (hereafter, it is referred as Preceding Invention 1; PI1) discloses a automatic balance type centrifuge which includes a two-arm type rotor lever and removes the imbalance of weight by transferring a rotor lever in the control of a rotor lever transfer mechanism comprising a worm and a worm wheel after detecting the weight imbalance in both ends of the rotor lever with the help of strain gauges stuck on the maximum bending stress points in both ends of the rotor lever hooking buckets loading samples.

In the next, U.S. Pat. No. 6,949,063 B2 (registered date: 27 Sep. 2005) and U.S. Pat. No. 7,297,097 B2 (registered date: 20 Nov. 2007) (hereafter, it is referred as Preceding Invention 2; PI2) discloses a revised version of the automatic balance type centrifuge of PI1, adopting a fixed type two-arm rotor lever of which the center a movable balance weight is employed at. The centrifuge removes the imbalance of weight by transferring a balance weight in the control of a balance weight transfer mechanism comprising a worm and a worm wheel after detecting the weight imbalance in both ends of the rotor lever with the help of pressure sensors installed beneath both ends of the rotor lever hooking buckets loading samples.

Next, Korean patent registration number KR 10-0615630 B1 (registered date: 17 Aug. 2006) (hereafter, it is referred to Preceding Invention 3; PI3) discloses an automatic balance type centrifuge including a rotor, wherein the rotor comprises: a plurality of rotating arms, e.g. three rotating arms, which support buckets containing samples, have the same radial length from a rotational shaft for centrifuging, and are disposed around the rotational shaft with equal angles; a balance weight installed to be movable along the radial direction of each rotating arm so as to compensate for the imbalance induced by the centrifugal force during centrifugal separation process; and a balance weight transfer mechanism transferring each balance weight horizontally along the radial direction of each corresponding rotating arm. In PI3, detection of imbalance of the centrifugal force, that is, imbalance of bucket weights, for example, can be carried out by an electronic scale which is installed in separate from the rotor and goes up and down in the lower part of each bucket.

Lastly, Korean patent registration number 10-0756231 B1 (registered date: 31 Aug. 2007) (hereafter, it is referred to Preceding Invention 4; PI4) discloses an automatic balance type centrifuge, wherein the imbalance of weight is compensated for by moving a rotor lever itself in the horizontally as in PI1, while the precision of driving the rotor lever is further improved. The detection of imbalance in the weight of buckets, for example, is carried out by an electronic scale which is installed in separate from the rotor and goes up and down in the lower part of each bucket.

However, in the above conventional automatic balance type centrifuges, the imbalance of weight is detected while the rotor is stopped, namely in static state, so that not only configuration of a complex circuit and mechanism is required but also long time is consumed to sense the weight imbalance.

Most of all, there has been a problem that compensation for the imbalance is not performed properly because the imbalance amount of bucket weights and the transfer amount of a balance weight or a rotor lever to correct the imbalance amount are calculated by force from the empirical data or formula obtained from numerous iteration of experiments and the above conventional centrifuges do not take into account the errors in the data or in the formula for calculating, the deviations between the products created during production process, and the change of center of gravity due to mechanical deformation by usage for a long time at all.

SUMMARY OF THE INVENTION

Technical Problem

The present invention is proposed to solve the problems described above. The object of the present invention is to provide an automatic balance adjusting centrifuge that calculates the magnitude and the location of imbalance of a centrifuge based on the vibration generated in the dynamic state and automatically compensate for the imbalance based on the calculation result, and the control method thereof.

Technical Solution

In order to achieve the above object, an automatic balance adjusting centrifuge of the present invention comprises: a rotor supporting buckets that load samples; a rotation driving means for rotating the rotor; a vibration detecting means for detecting vibration; a imbalance compensating means for compensating the weight imbalance of the rotor; and a control means for controlling the imbalance compensating means to compensate for the weight imbalance of the rotor after calculating the imbalance based on the amount of the vibration detected by the vibration detecting means in the state of rotating the rotor with a predetermined rotational velocity.

In the above configuration, the vibration detecting means may comprise any one of a displacement sensor, a velocity sensor and an acceleration sensor.

Meanwhile, the rotation driving means comprises a centrifuge motor whose rotational shaft is combined with the rotor by shaft coupling, and, in this case, the vibration detecting means is preferably installed into the body of the centrifuge motor.

Furthermore, the rotor may comprise a plurality of rotating arms which have the same radial length, are disposed with equal radial angles, and support buckets between each other and the imbalance compensating means may comprise a balance weight, being transferred along the radial direction, installed in each rotating arm.

Meanwhile, a control method for an automatic balance adjusting centrifuge of the present invention comprises: step (a) of measuring the amount of vibration in a state of accelerating a rotor, supporting buckets that load samples, at a predetermined rotational velocity for measurement; step (b) of determining whether the amplitude of vibration measured in the step (a) is greater than the allowed value; and step (c) of, in case that the amplitude of the vibration is greater than the allowed value from the determination of step (b), compensating for the weight imbalance of the rotor by the amount of the weight balance calculated from the amount of vibration measured in the step (a) and returning to the step (a), otherwise, performing a centrifugal separation by accelerating the rotor at the working velocity.

In the above configuration, the rotational velocity for measurement is given with two or more values, increasing as the round advances, and the allowed value is given for the rotational velocity for measurement of each round, set by a smaller value as rotational velocity of the rotor increases.

Meanwhile, in the step (c), it is preferable for the compensation of weight imbalance to be carried out while the rotor is stopped.

Furthermore, if the amplitude of vibration measured in the step (a) is greater than the allowed value and is greater than the maximum value set up to cope with abnormal vibration, it is preferable to make an alarm after stopping the rotor.

Advantageous Effects

According to the automatic balance adjusting centrifuge the present invention and the control method thereof, the weight imbalance is compensated for by the amount of vibration actually measured in the dynamic state of driving the centrifuge, thereby the weight imbalance may be compensated for correctly regardless of the errors in the data for adjusting the unbalance or in the formula for the data, the deviations between the products during production process and physical distortion originating from long-term leaving alone, and so forth.

Furthermore, because the weight imbalance is calculated from the measured vibration by a vibration sensor installed at a fixed location, it is unnecessary to configure a complex circuit and mechanism to measure the weight as usual and it is possible to shorten the necessary time to sense the weight imbalance.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

In the following, preferred embodiments of the automatic balance adjusting centrifuge and the control method of the present invention are described in detail referring to the accompanying drawings, and prior to that, the basic principles of operation of the present invention are described.

1. Dynamic Balancing of a Rotating Body

The imbalance due to the mismatch between the center of rotation and the center of gravity for a rotating body not only causes vibration but also degrades the performance of a rotating body system, and the dynamic balancing of a rotating body is to coincide the center of rotation with the center of gravity so as to remove the vibration owing to the imbalance of a rotating body.

The dynamic balancing method can be classified as the influence coefficient method, modal balancing method and merging method, and so forth, or can be divided into single-plane balancing, dual-plane balancing and multi-plane balancing according to the number of planes for measurement and compensation. For the dynamic balancing, sensors to measure the amplitude and phase for displacement, velocity or acceleration are required.

2. Influence Coefficient Method

The influence coefficient method is relatively simple among the balancing schemes for a rotating body and is generally accepted over the wide range of applications. The balancing method using the influence coefficient method is to attach/remove compensating mass to/from the rotating body system after finding imbalance state from several numbers of trial runs using trial mass. Here, 'influence coefficient' represents the dynamic characteristics of a system as a function of indicating the variation of the vibration response of the system, and is a function of rotational velocity.

Major features of the influence coefficient method may be such that it is most widely used for balancing, and it is applicable for both a rigid body rotor and an elastic body rotor, for both field and measurement equipments for balancing, and for both single-plane balancing and multi-plane balancing.

The basic principle of the influence coefficient method is that the amplitude of the vibration is proportional to the imbalance amount as the following Equation (1) below.

$$G=aU \qquad (1)$$

Where, G is given by measuring the vibration. a is the influence coefficient representing the characteristics of the system, that is, the vibration proportional constant, and U is the imbalance vector. All variables can be expressed in complex number because they have information for the amplitude and the phase.

3. The Procedure of the Influence Coefficient Method

Figure 1:
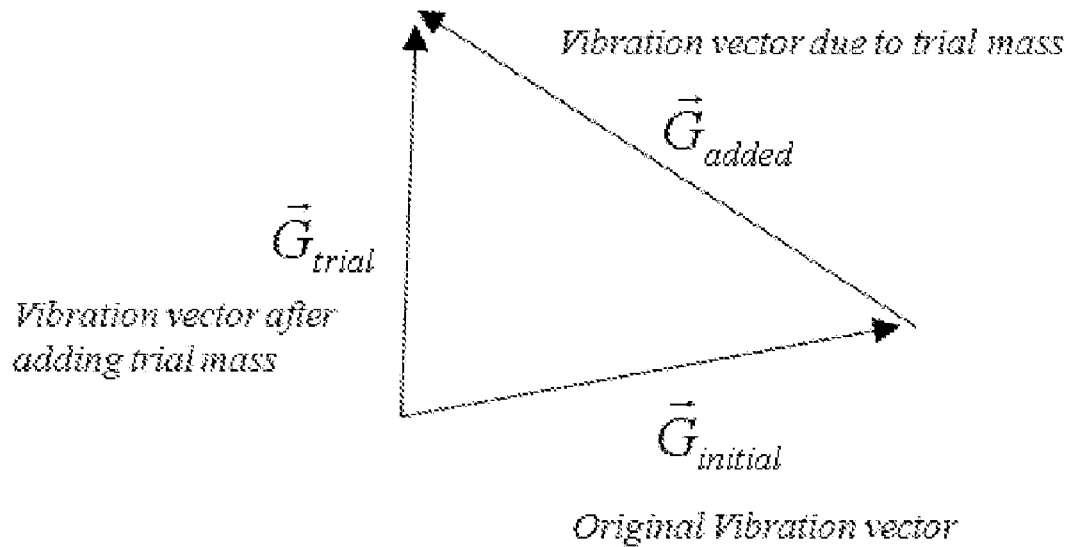
FIG. 1 is a vector diagram for explaining the principle of the influence coefficient method.

FIG. 1 is a vector diagram explaining the principles of the influence coefficient method. Considering the relation that the imbalance amount (added mass*distance) $\vec{U}_{added}$ generated by added mass is proportional to the vibration amount vector $\vec{G}_{added}$ by a trial mass, the vibration proportional constant can be obtained and in FIG. 1 $\vec{G}_{initial}$ represents the vibration amount vector according to an initial run, $\vec{G}_{trial}$ represents the vibration amount vector measured after adding a trial mass to an arbitrary location. This is addressed in more detail below.

Step 1: Measure the amplitude and phase of the vibration amount of according to the initial run and denote it as $\vec{G}_{initial}$. Assuming that the relationship between the vibration amount and the imbalance amount is linear at a particular rotation, the Equation (2) may be obtained.

$$\vec{G}_{initial} = G_{initial} \exp(j\phi_{initial}) = a\vec{U}_{initial} \qquad (2)$$

Where, $\vec{U}_{initial}$ is the imbalance vector and a is the vibration proportional constant.

Step 2: Adhere a trial mass to a particular location, measure the vibration amount, and denote it as $\vec{G}_{trial}$. Then, the total imbalance amount $\vec{U}_{trail}$ replaced the $\vec{U}_{initial}$ with $\vec{U}_{initial}+\vec{U}_{added}$ as in the Equation (3) shown below.

$$\vec{G}_{Trial} = a\vec{U}_{trial} = a(\vec{U}_{initial} + \vec{U}_{added}) \qquad (3)$$

Step 3: Subtract the Equation (2) from the Equation (3) and arrange for a, then the Equation (4) is deduced.

$$\alpha = \frac{\vec{G}_{trial} - \vec{G}_{initial}}{\vec{U}_{added}} \qquad (4)$$

Where, $\vec{G}_{trail}$, $\vec{G}_{initial}$ and $\vec{U}_{added}$ are already known and the vibration proportional constant a can be obtained from the Equation (4).

Step 4: Accordingly, the imbalance amount $\vec{U}_{initial}$ can be obtained as the Equation (5) substituting the Equation (2) for the Equation (4).

$$\vec{U}_{initial} = \frac{\vec{G}_{initial}}{\alpha} = \frac{\vec{U}_{added}\vec{G}_{initial}}{\vec{G}_{trial} - \vec{G}_{initial}} \qquad (5)$$

Step 5: Finally, the compensation amount and the compensation direction can be obtained from the Equation 6 as follows.

$$\vec{U}_c = -\vec{U}_{initial} \qquad (6)$$

4. The Principles of an Automatic Balance Adjusting Centrifuge

As described in the above, the vibration proportional constant used in the influence coefficient method is a function of rotational velocity, therefore, the amplitude and the direction of the imbalance may be obtained if the vibration proportional constant for each rotational velocity of the system is known from the prior trial in advance.

By following the predetermined procedure, the vibration proportional constant for each rotational velocity, namely, the relationship between the vibration amount and the imbalance amount is obtained and stored in the basic database.

Then, after measuring the vibration amount in the initial trial run, the amplitude and the location of the imbalance is automatically calculated by utilizing the vibration proportional constant stored in the basic database and the amplitude and phase of the measured vibration, if the amplitude of the vibration is greater than the allowed value.

Here, the amount to compensate is equal to the imbalance amount while its phase is opposite to the imbalance amount, and the balance is maintained in centrifuging by transferring the balance weight in accordance with the amount of compensation obtained from a predetermined compensating algorithm 5. The Balance Weight Transfer Algorithm The relationship between the vibration amount and the imbalance amount may be linear as the following Equation (7), $$\vec{G} = a\vec{U} \qquad (7)$$

Where, $\vec{G}$ is the vibration amount vector, $\vec{U}$ is the imbalance amount vector, and a is the proportional constant with amplitude and direction.

In the above Equation (7), if the proportional constant a is known and the vibration amount $\vec{G}$ is also known by measuring, the imbalance amount may be obtained by the following Equation (8).

$$\vec{U} = \frac{\vec{G}}{a} \qquad (8)$$

Figure 2:
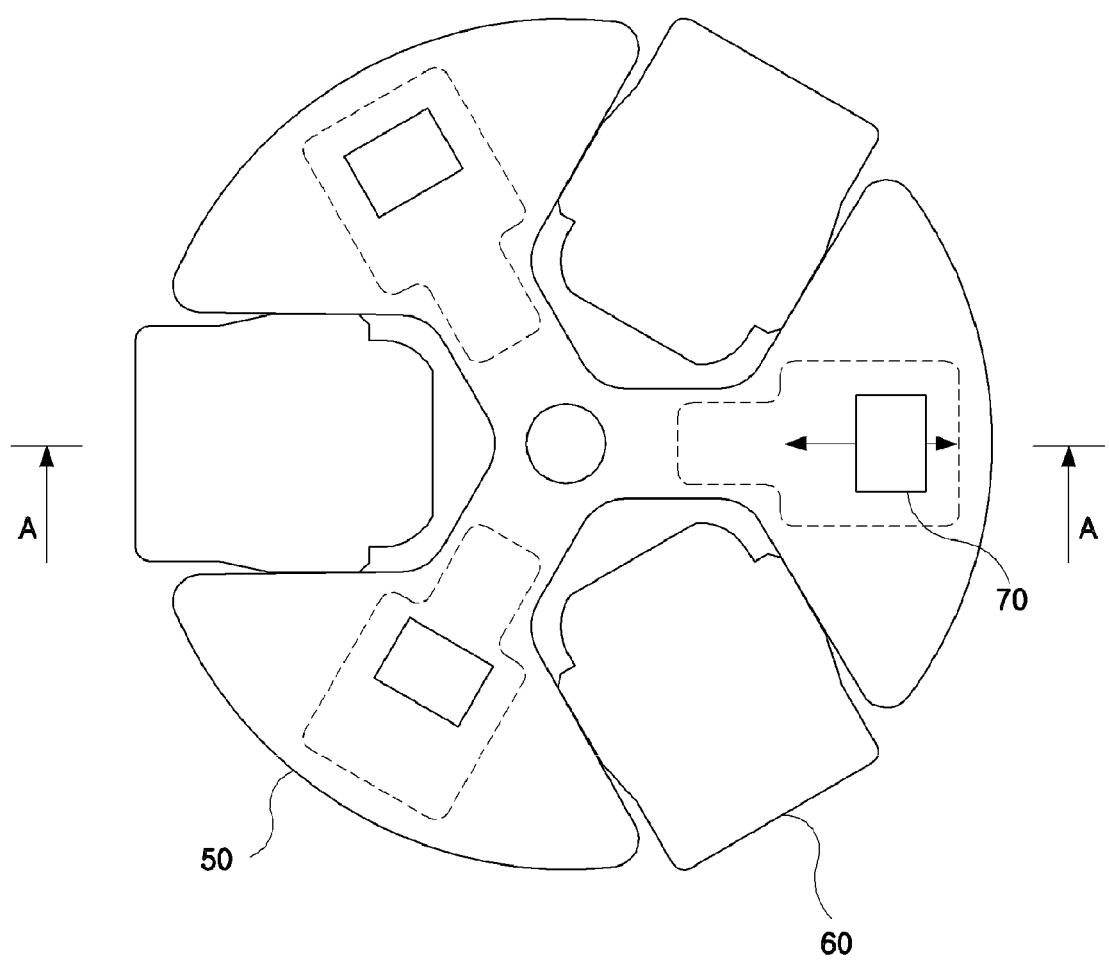
FIG. 2 is a plane view of an automatic balance adjusting centrifuge according to one embodiment of the present invention.
Figure 3:
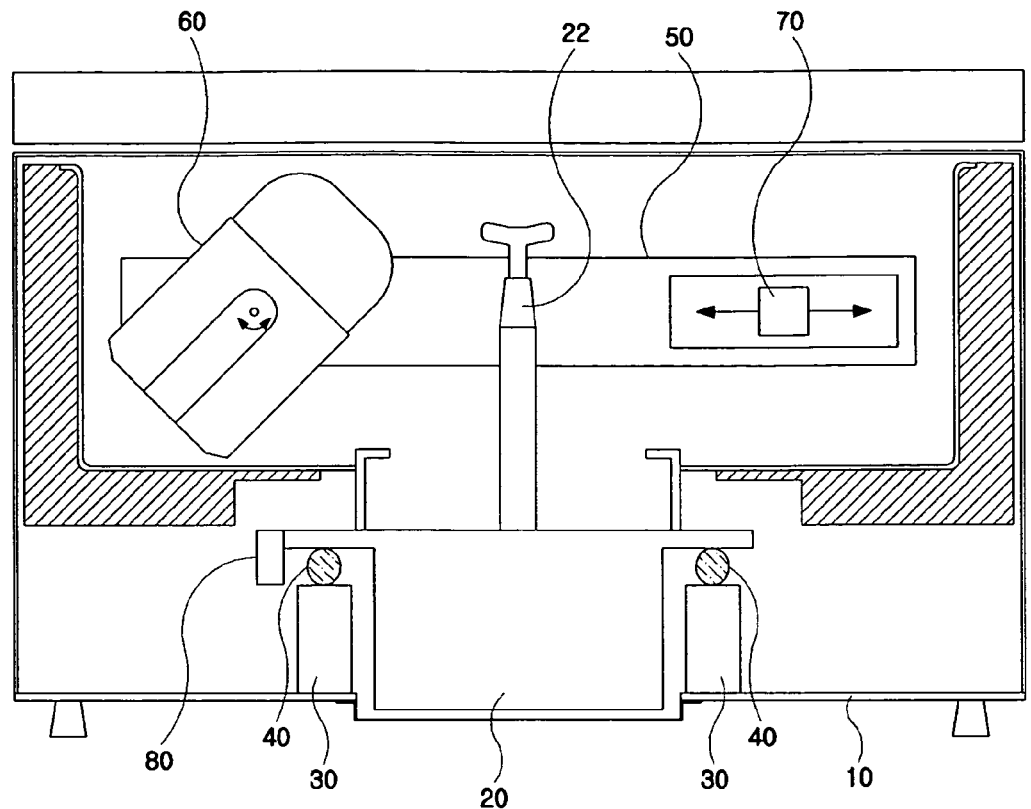
FIG. 3 is a cross sectional view sectioned along the line A-A in FIG. 2.

FIG. 2 is a plane view showing an outline of an automatic balance adjusting centrifuge according to one embodiment of the present invention, and FIG. 3 is a cross-sectional view sectioned along the line A-A in FIG. 2.

As shown in FIG. 2 and FIG. 3, in the automatic balance adjusting centrifuge of the present invention, the centrifuging motor 20 is located at the center of the bottom of a casing 10, of which a shaft faces to the top of the casing 10, and the centrifuging motor 20 is supported on the base 30 as being floated. Furthermore, an anti-vibration member 40 such as anti-vibration rubber is stuffed between the centrifuging motor 20 and the base 30 to absorb the vibration during centrifuging.

The shaft 22 of the centrifuging motor 20 is combined with a rotor 50 by shaft coupling, and the rotor 50 comprises, for example, three rotating arms which have the same radial length from the shaft 22, are disposed around the shaft with equal angles, say, 120° degrees between each other. The spaces between the rotating arms are occupied by buckets 60, which contain samples, supported by the rotating arms.

A balance weight 70 installed to be movable along the radial direction and to compensate for the imbalance generated by the centrifugal force during centrifuging process and a balance weight transfer mechanism (not illustrated), which transfers each balance weight 70 along the radial direction of the rotating arm, are equipped in each rotating arms.

A vibration sensor 80 for measuring the amount of vibration during the centrifuging process is attached to the proper place of the centrifuge, for example, the body of the centrifuging motor 20 or the bracket mounted on the body and extended externally.

Figure 4:
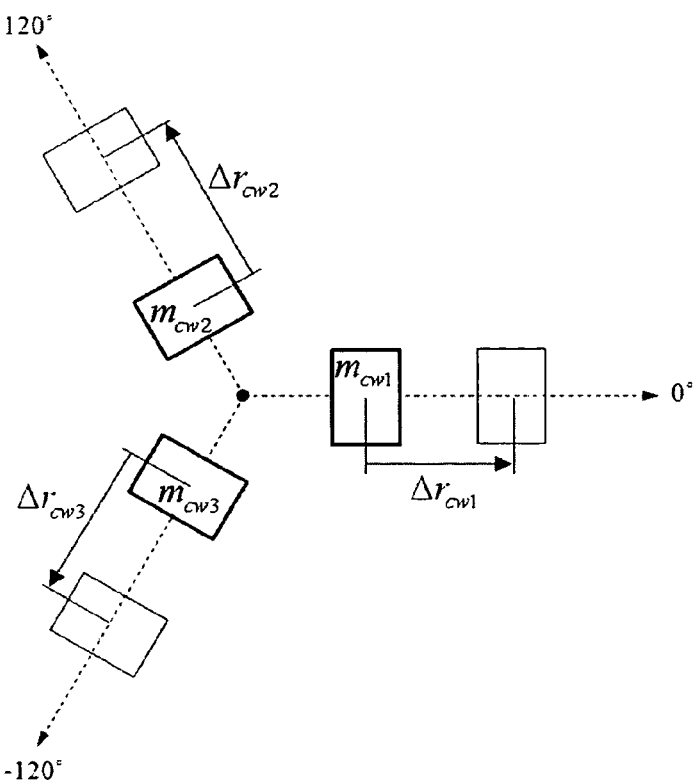
FIG. 4 is a diagram for explaining a transfer direction of a balance weight in the automatic balance adjusting centrifuge shown in FIG. 2.
Figure 5:
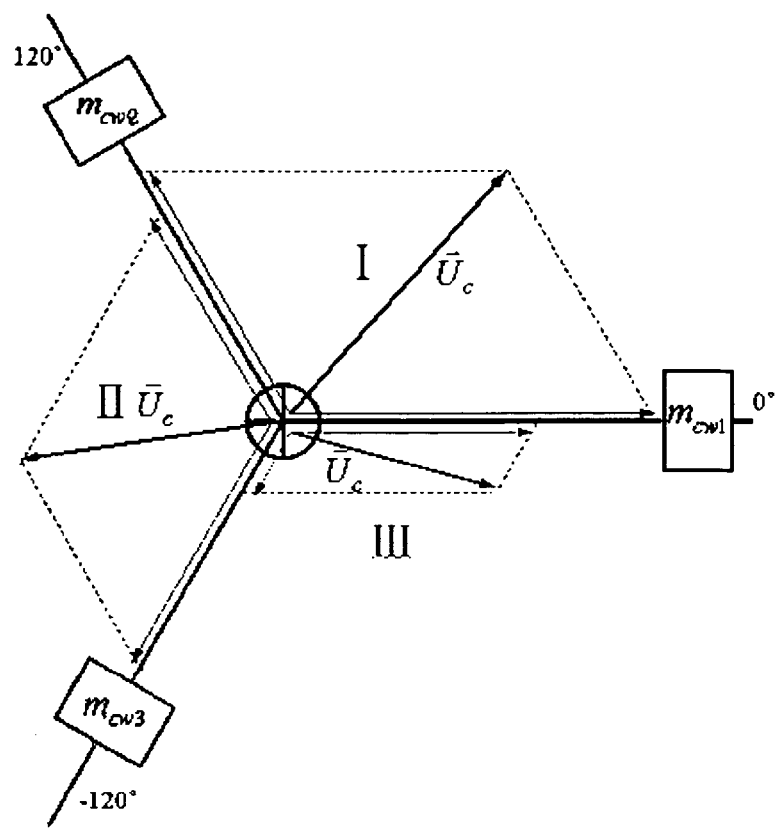
FIG. 5 is a diagram for explaining a method of transferring a balance weight in accordance with the location of the compensation amount.

FIG. 4 explains the transfer direction of the balance weight in the automatic balance adjusting centrifuge illustrated in FIG. 2 and FIG. 5 explains the method of transferring the balance weight in accordance with the location of the compensation amount. In FIGS. 4 and 5, the relationship of angles between three balance weights is determined with respect to the first balance weight ($m_{cw1}$) as in the following Equation (9).

$$\theta_{cw1}=0°, \theta_{cw2}=120°, \theta_{cw3}=-120° \qquad (9)$$

Meanwhile, the moment generated by the transfer of the balance weight 70 is determined as following Equation (10).

$$m_{cw1}\Delta\vec{r_{cw1}}+m_{cw2}\Delta\vec{r_{cw2}}+m_{cw3}\Delta\vec{r_{cw3}}=\vec{U_{cw}} \qquad (10)$$

In the above Equation (10), $m_{cw1}$, $m_{cw2}$ and $m_{cw3}$ represent the mass of each balance weight, $\Delta\vec{r_{cw1}}$, $\Delta\vec{r_{cw2}}$ and $\Delta\vec{r_{cw3}}$ represent the position vector indicating the transfer distance of each balance weight, and $\vec{U_{cw}}$ represents the imbalance amount vector of the total balance weights.

Accordingly, to make a balance, as the following Equation (11), the compensation amount should be equal to the moment generated by the balance weights.

$$\vec{U_c}=\vec{U_{cw}}, U_c\exp(j\theta_c)=U_{cw}\exp(j\theta_{cw}) \qquad (11)$$

In other words, the sum of moment vectors due to balance weights is equal to the moment vector due to the compensation amount. Accordingly, the compensation amount may be decomposed in each direction of balance weights, that is, 0°, 120° and −120° radial direction. Furthermore, the decomposition of the compensation amount may be achieved by moving only one or two balance weight(s) in the direction of the compensation amount without moving all three balance weights. That is, as shown in FIG. 5, the compensation amount is decomposed by using two balance weights adjacent to the direction of the compensation amount. For example, if the compensation amount corresponds to the I region, then the first balance weight ($m_{cw1}$) and the second balance weight ($m_{cw2}$) are used for the decomposition, if the compensation amount corresponds to the II region, then the second balance weight ($m_{cw2}$) and the third balance weight ($m_{cw3}$) are used for the decomposition, and if the compensation amount corresponds to the III region, the third balance weight ($m_{cw3}$) and the first balance weight ($m_{cw1}$) are used for the decomposition. Accordingly, if the amplitude and phase of the vibration amount measured after loading buckets are denoted as G and φ respectively, then the transfer distances for automatic balancing $\Delta\vec{r_{cw1}}$, $\Delta\vec{r_{cw2}}$ and $\Delta\vec{r_{cw3}}$ may be obtained with ease by expressing them as a function of G, φ and the proportional constant a.

Figure 6:
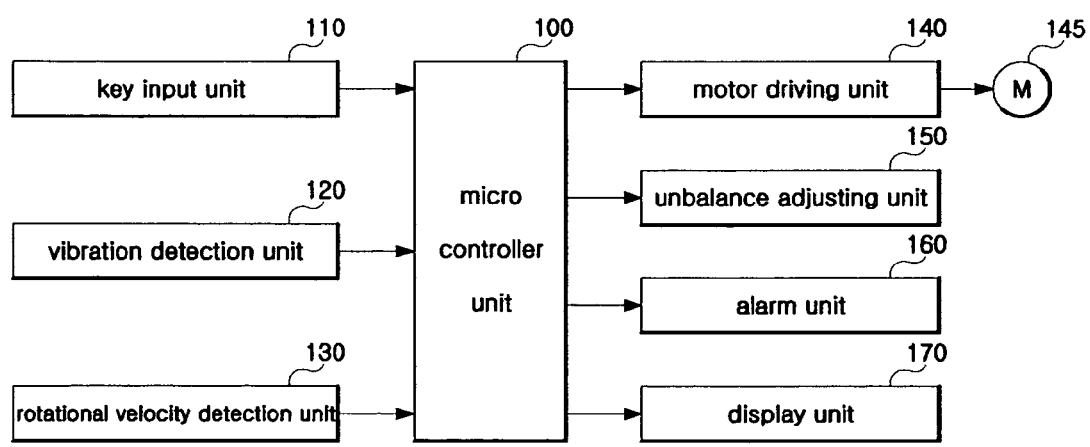
FIG. 6 is a block diagram of the electrical part in the automatic balance adjusting centrifuge of the present invention.

FIG. 6 shows a block diagram of the electrical part in the automatic balance adjusting centrifuge of the present invention. As shown in FIG. 6, the electrical configuration of the automatic balance adjusting centrifuge of the present invention comprises: a key input unit 110 that receives or sets up all kinds of information required to operate the centrifuge; a vibration detection unit 120 to detect the dynamic state, namely, the vibration in rotation, of the centrifuge; a centrifuging motor 145 to rotate the rotor and a driving unit 140 thereof; a rotational velocity detection unit 130 to detect the rotational velocity of the rotor; an alarm unit 160 to give an alarm for the occurrence of the malfunction or the over-vibration of the centrifuge; a display unit 170 to display all kinds of information generated during the operation of the centrifuge; an imbalance compensating unit 150 for compensating the weight imbalance in the centrifuge; and a microcontroller unit 100 to control the overall operation of the centrifuge generally.

In the above described configuration of the centrifuge, the centrifuging motor 145 may be, for example, a brushless DC motor. The vibration detection unit 120, for example, may be implemented by, for example, an acceleration sensor, a velocity sensor or a displacement sensor, and when implemented with an acceleration sensor, it may be implemented by an acceleration sensor, which detects one or more axes. The rotational velocity detection unit 130 may be implemented by the encoder type detector. The imbalance compensating unit 150 may be implemented, for example, by transferring of the balance weights as shown in FIG. 3 or by moving directly the rotor lever as disclosed in the preceding inventions.

Finally, the microcontroller unit 100 may comprise a microprocessor and attached memories, and the programs whose flow follows the flowchart of FIG. 7, functions for converting the transfer distance, proportional constants, maximum values described later and a set of allowed values are stored in the attached memories.

Figure 7:
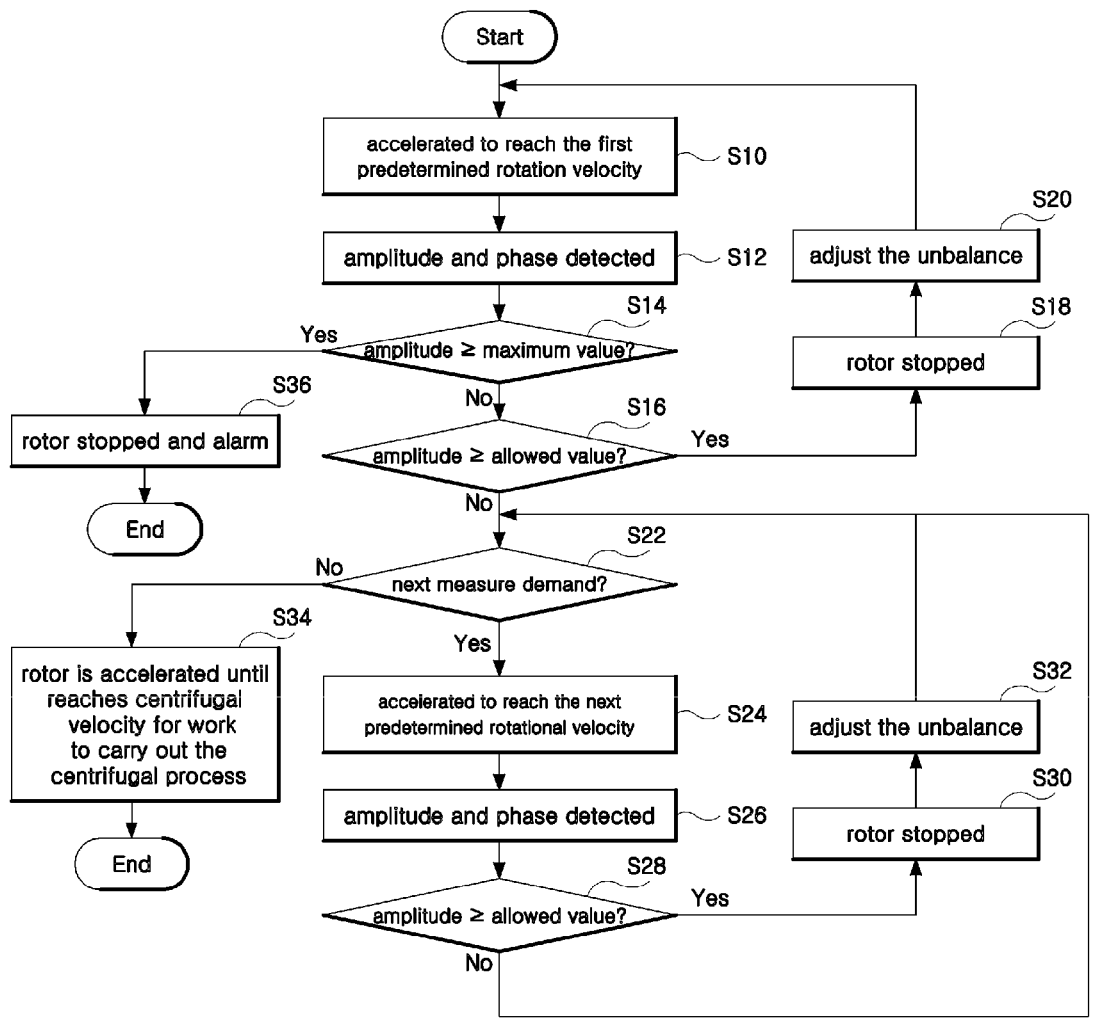
FIG. 7 is a flowchart for the explaining a control method for the automatic balance adjusting centrifuge of the present invention

FIG. 7 is the flowchart explaining the control method for the automatic balance adjusting centrifuge of the present invention. In advance, the vibration proportional constants, which are obtained for rotational velocities divided by a constant step for measurement, should be piled as a database, and the maximum value (over the compensation rage or abnormal vibration) of rotational velocities for measurement and the allowed values corresponding to compensation resolution should be set up. In this process, for the regions in which the rotational velocity is not measured, the linear interpolation method may be used.

As shown in FIG. 7, in the step S10, the centrifuging motor 145 is driven so that the rotor may be accelerated to the predetermined rotational velocity of the first round for measurement, for example, 500 rpm. Next, in the step S12, according to the vibration amount sensed by the vibration detection unit 120 at this velocity, the magnitude, namely, the amplitude and phase is measured, and then in the step S14, it is determined whether the measured amplitude may be greater than the predetermined maximum value above which the centrifuge may not sustain or the compensation limit is exceeded. If the measured value is greater than the predetermined maximum value, it means that the over-vibration occurs or the compensation limit is exceeded, and then the flow goes to the step S36 to stop the rotor immediately and to issue relevant alarm or message.

Meanwhile, according to the determination in the step S14, if the measured amplitude is less than the maximum value, then the flow advances to the step S16 and it is determined whether the amplitude is greater than the allowed value corresponding to the rotational velocity of the round, wherein the allowed value may be set up higher as the rotational velocity is lower. If the determination in the step S16 turns out to be that the amplitude is greater than the allowed value then it means that the compensation for the imbalance is required, and then the flow advances to the step S18 to stop the rotor and goes to the step S20 to compensate for the imbalance, and then returns to the step S10.

Meanwhile, if the determination in the step S16 turns out to be that the amplitude is less than the allowed value, then the flow advances to the step S22 and it is determined whether the rotational velocity of the next round for measurement, that is, the request for measuring the vibration amount above the rotational velocity of the first round for measurement exists. The reason for the above processes is that most cases of imbalance of a rotating body may be created by the structure of the rotating body or various factors, or that the imbalance state of rotating body is likely to vary near the critical velocity (dangerous velocity). Thus, it is necessary to adjust adequately by accommodating the above reason. Therefore, there is no reason to have the step S22, if there is no critical velocity, at which imbalance of rotating body is apt to vary, until the rotational velocity for measurement reaches working velocity for centrifuging. Moreover, the maximum rotational velocity may be determined to be lower than the working velocity for centrifuging.

If the determination in step S22 turns out to be that there is no need to measure the vibration amount in the next round, it means that the imbalance has been compensated in the current state and then the rotor is accelerated to the working velocity for centrifuging to perform the centrifugal separation process in the step S34. On the other hand, if there is a request for measuring the vibration amount in the next round, the flow advance to the step S24 to accelerate the rotor to the rotational velocity for measurement of the next round, for example, 1,000 rpm and then in the step S26, the amplitude and phase is measured from the vibration amount sensed by the vibration detection unit 120 at this velocity. Next, in the step S28, the flow determines whether the amplitude measured is greater than the allowed value and if the amplitude is greater than the allowed value, it means that the adjustment for the unbalance is required so that unbalance is adjusted performing the steps of S30-S32 while the rotor is in stop and then return to the step of S22. Meanwhile, if the amplitude is less than the allowed value, it means that the adjustment for the unbalance is not possible and return to the step of S22.

Following the flow, in the step S22, if there is no request of the next round for measuring the vibration amount, the step S34 is performed. Here, the allowed value is relatively lower as the rotational velocity is higher.

The automatic balance adjusting centrifuge and the control method thereof of the present invention is not limited to the embodiments described above and it should be understood that various modifications and changes may be made to these embodiments without departing from the broader spirit and scope of the present invention. For example, in the above embodiments, the imbalance is compensated while the rotor is stopped, however, the imbalance may be compensated while the rotor rotates. Furthermore, by sensing the vibration amount in real time even during centrifuging, if the amplitude comes to be greater than the maximum value, the rotor may be stopped immediately. The vibration sensor may be located on any fixed place of the body of the centrifuge motor or of the bracket attached to the motor body and extended to the outside, however, it is desirable to locate the vibration sensor as far as possible from the rotational axis of the rotor so as to detect big vibration.

What is claimed is:

1. A control method for automatically balance adjusting a centrifuge, comprising:
   (a) measuring the amount of vibration in a rotor of the centrifuge, supporting buckets that load samples, at a first rotational velocity;
   (b) determining whether the measured amount of vibration at the first rotational velocity is greater than a first allowed value;
   (c) if the measured amount of vibration is greater than the first allowed value, compensating for a weight imbalance of the rotor by an amount calculated based on the measured amount of vibration; and
   d) if the measured amount of vibration is less than or equal to the first allowed value, performing a centrifugal separation by accelerating the rotor to a working velocity.

2. The method of claim 1, wherein step (c) further comprises:
   (i) accelerating the rotor to a next rotational velocity;
   (ii) measuring the amount of vibration in the rotor at the next rotational velocity;
   (iii) determining whether the amount of vibration of the rotor at the next rotational velocity is greater than a next allowed value; and
   (iv) if the amount of vibration in the rotor at the next rotational velocity is greater than the next allowed value, compensating for a weight imbalance of the rotor by an amount calculated based on the amount of vibration in the rotor at the next rotational velocity and returning to step (i).

3. The method of claim 2, wherein the compensation of weight imbalance in step (c) is carried out while the rotor is stopped.

4. The method of claim 2, wherein the next rotational velocity is greater than the first rotational velocity and the next allowed value is less than the first allowed value.

5. The method of claim 1, wherein if the measured amount of vibration is greater than the allowed value and is greater than a maximum value set up to cope with abnormal vibration, an alarm is made after stopping the rotor.

* * * * *